United States Patent
Stein et al.

(10) Patent No.: US 9,051,932 B2
(45) Date of Patent: Jun. 9, 2015

(54) FACE SEALING ANNULAR VALVE

(75) Inventors: Uwe Stein, Lothian (GB); Jens Eilers, Lothian (GB); Fergus McIntyre, Lothian (GB); Gordon Voller, Lothian (GB)

(73) Assignee: ARTEMIS INTELLIGENT POWER LIMITED, Loanhead (GB)

( * ) Notice: Subject to any disclaimer, the term of this patent is extended or adjusted under 35 U.S.C. 154(b) by 443 days.

(21) Appl. No.: 13/390,703

(22) PCT Filed: Aug. 3, 2011

(86) PCT No.: PCT/JP2011/004411
§ 371 (c)(1),
(2), (4) Date: May 2, 2012

(87) PCT Pub. No.: WO2013/018144
PCT Pub. Date: Feb. 7, 2013

(65) Prior Publication Data
US 2013/0032745 A1 Feb. 7, 2013

(51) Int. Cl.
*F16K 15/08* (2006.01)
*F04B 53/10* (2006.01)

(52) U.S. Cl.
CPC .............. *F04B 53/10* (2013.01); *F16K 15/08* (2013.01)

(58) Field of Classification Search
CPC ....... F16K 25/00; F16K 15/142; F16K 15/08; F04B 53/10
USPC .............. 137/511–512, 528, 843, 847, 860, 137/614.2, 512.1, 512.5; 251/84–86, 284, 251/333–334
See application file for complete search history.

(56) References Cited

U.S. PATENT DOCUMENTS

| | | | | |
|---|---|---|---|---|
| 1,939,128 A | * | 12/1933 | Meyer | 251/86 |
| 1,942,417 A | * | 1/1934 | Ferlin et al. | 251/84 |
| 3,063,467 A | * | 11/1962 | Roberts, Jr. et al. | 251/333 |
| 3,131,716 A | * | 5/1964 | Griswold et al. | 137/503 |
| 3,594,824 A | | 7/1971 | Nakib et al. | |

(Continued)

FOREIGN PATENT DOCUMENTS

CN 2211527 Y 11/1995
DE 102009008692 A1 8/2010

(Continued)

OTHER PUBLICATIONS

Office Action mailed Nov. 21, 2013, corresponds to Chinese patent application No. 201180037058.8.

(Continued)

*Primary Examiner* — John Bastianelli
(74) *Attorney, Agent, or Firm* — Lowe Hauptman & Ham, LLP

(57) ABSTRACT

In a face sealing annular valve, an annular valve member is retained around or within a guide. The annular valve member is configured so that, when the annular valve member and the annular valve seat are coaxial, the spacing between the guide means and the guide-engaging surface region increases with distance along the central axis from a minimum of spacing between the annular valve member and the guide means. An end stop limits the tilt of the annular valve member. Advantageously, the annular valve member has restricted radial movement, enabling a good seal to be formed, while being unable to simultaneously contact diametrically opposite sides of the guide and jam.

15 Claims, 7 Drawing Sheets

(56) References Cited

U.S. PATENT DOCUMENTS

| | | | |
|---|---|---|---|
| 3,756,273 A * | 9/1973 | Hengesbach | 137/540 |
| 4,535,808 A * | 8/1985 | Johanson et al. | 137/543 |
| 4,768,549 A * | 9/1988 | Mancassola | 137/543 |
| 5,230,363 A | 7/1993 | Winn, Jr. et al. | |
| 7,178,553 B2 * | 2/2007 | Peric et al. | 137/630.22 |
| 2011/0020159 A1 | 1/2011 | Kuttler et al. | |

FOREIGN PATENT DOCUMENTS

| | | | |
|---|---|---|---|
| DE | 202010010935 U1 | 10/2010 | |
| EP | 0512594 A1 | 11/1992 | |
| JP | 63137178 U | 9/1988 | |
| JP | 174388 U | 5/1989 | |
| JP | 6137445 A | 5/1994 | |

OTHER PUBLICATIONS

International Preliminary Report on Patentability mailed Feb. 13, 2014, corresponds to PCT/JP2011/004411.

Office Action mailed Mar. 11, 2014, corresponds to Japanese patent application No. 2012-508703.

International Search Report and Written Opinion for PCT/JP2011/004411, dated Apr. 25, 2012.

Notification for patent registration formalities mailed Aug. 1, 2014, corresponding to Chinese application No. 201180037058.8.

Decision to Grant a Patent mailed Nov. 14, 2014, corresponding to Japanese patent application No. 2012-508703.

* cited by examiner

FACE SEALING ANNULAR VALVE

RELATED APPLICATIONS

The present application is a National Phase of International Application Number PCT/JP2011/004411, filed Aug. 3, 2011.

TECHNICAL FIELD

The present invention relates to the field of face sealing annular valves for use in fluid-working machines such as hydraulic pumps, hydraulic motors and hydraulic pump-motors.

BACKGROUND ART

It is known to use face sealing annular valves to regulate the flow of hydraulic fluid into or out of a piston cylinder, or other working chamber of a fluid-working machine. In annular valves of this type, a ring-shaped fluid path is selectively sealed by a similarly ring-shaped annular valve member. Annular valves are advantageous as they can provide a relatively large cross-sectional area through which hydraulic fluid can flow into or out of a working chamber.

Face sealing annular valves comprise an annular valve member which is typically mounted on a guide and they slide axially backward and forwards on the guide in use. However, a known problem with face sealing annular valves is that the annular valve members can jam in use if they tilt too far relative to the guide.

It is known to address this problem by providing annular valve members which are relatively long compared to their radius. If the length/radius ratio is sufficiently large, the annular valve member will not be able to tilt sufficiently far relative to the guide for the annular valve member to jam. However, it is undesirable for annular valve members to be long as this increases their mass and can increase the overall size of the annular valve.

The problem may also be addressed by using an annular valve member which can only move along a relatively short axial range and which has an inner diameter which is significantly larger than the outer diameter of the guide. In this case, jamming is unlikely, but the annular valve member can move significantly in a radial direction. Without sufficient restriction on radial motion, it is difficult to form an effective seal.

Therefore, the invention aims to provide an annular valve including an annular valve member which does not jam in use and which has restricted radial motion to enable a good seal to be formed. The invention also addresses the problems of keeping drag and friction forces low to allow for rapid and efficient operation and aims to provide an annular valve member with sufficient strength to withstand the stress of high pressure oil acting on it in use.

SUMMARY OF INVENTION

According to a first aspect of the invention there is provided a face sealing annular valve for a fluid working machine, the valve having a valve body arranged around a central axis and comprising an annular valve seat and guide means (for example, a guide) and an annular valve member located around or within the guide means; the guide means comprising one or more cylindrically arranged guides to restrict radial motion of the annular valve member; the annular valve member arranged around an axis of symmetry and moveable axially in relation to the guide means to sealedly engage with the annular valve seat; and
a guide engaging surface region extending around a circumference of the annular valve member;
characterised in that the annular valve member is configured so that, when the annular valve member and the annular valve seat are coaxial, the spacing between the guide means and the guide-engaging surface region increases with distance along the central axis from a minimum of spacing between the annular valve member and the guide means.

The annular valve member may be retained around guide means, and when the annular valve member and the annular valve seat are coaxial, the spacing between the guide means and the guide-engaging surface region may increase with distance along the central axis from a minimum inner circumference of the annular valve member. The annular valve member may be retained within guide means and when the annular valve member and the annular valve seat are coaxial, the spacing between the guide means and the guide-engaging surface region may increase with distance along the central axis from a maximum outer circumference of the annular valve member.

The annular valve seat may comprise an annular sealing surface and at least one aperture providing a fluid pathway through the body associated with the or each said sealing surface. In some embodiments, the annular valve seat may comprise more than one annular sealing surface.

The annular valve member may comprise an annular seat-engaging surface (or in some embodiments more than one annular seat-engaging surface, and in a preferred embodiment two annular seat engaging surfaces) for sealing engagement with the or each sealing surface. Accordingly, the annular valve member may be moveable in relation to the guide means to sealedly engage the or each seat-engaging surface with the or each sealing surface and thereby restrict flow of fluid through the fluid pathway.

In some embodiments, the minimum of spacing between the annular valve member and the guide means is between the guide means and a part of the guide engaging surface region. The minimum of spacing between the annular valve member and the guide means may be between the guide means and a said seat-engaging surface.

In some embodiments the spacing between the guide means and the annular valve member increases monotonically with distance along the central axis from the minimum of spacing.

In some embodiments, the spacing between the guide means and the annular valve member increases non-monotonically with distance along the central axis from the minimum of spacing.

In some embodiments, the spacing between the guide means and the annular valve member increases discontinuously with distance along the central axis from the minimum of spacing. For example, the guide engaging surface region may comprise a plurality of surfaces of the annular valve member. In some embodiments, the spacing between the guide means and the annular valve member may have more than one local minimum and/or maximum (in relation to axial distance from the said minimum of spacing), when the annular valve member and the annular valve seat are coaxial.

The annular valve and annular valve member may be circularly symmetric, or may be oval or ovoid. The guide engaging surface region may comprise one or more guide engaging surfaces arranged generally circularly around the axis of symmetry, but having a profile adapted to cooperate with the guide means (e.g. to permit the annular valve member to move slideably along the central axis, and in some embodiments to permit a degree of motion perpendicular to the central axis).

Thus, in embodiments wherein the annular valve member is located around the guide means, the diameter of the guide-engaging surface region increases with distance along the axis of symmetry from the minimum inner circumference (and may increase monotonically, non-monotonically, continuously or discontinuously). In some embodiments, the annular valve member may be located within the guide means, and the diameter of the guide-engaging surface region may decrease (monotonically, non-monotonically, continuously or discontinuously) with distance along the axis of symmetry from the maximum outer circumference.

Accordingly, the invention extends to an annular valve member for a face sealing annular valve of a fluid working machine according to the first aspect, the annular valve member arranged around an axis of symmetry and comprising a guide engaging surface region extending around a circumference of the annular valve member for engagement around (or within) cylindrically arranged guide means of a valve body of a face sealing annular valve for a fluid working machine;

characterised in that the diameter of the guide-engaging surface region increases (or decreases) (monotonically, non-monotonically, continuously or discontinuously) with distance along the axis of symmetry from a minimum inner (or maximum outer) diameter of the annular valve member. In some embodiments, a said seat-engaging surface extends (preferably smoothly) to a guide-engaging surface.

In some embodiments, at least part of the guide engaging surface region has a tapered diameter, the diameter increasing (or decreasing) with distance from a minimum inner (or maximum outer) diameter of the annular valve member, along the axis of symmetry, i.e. such that the spacing between the guide means and the guide engaging surface region increases with distance from the minimum of spacing between the annular valve member and the guide means, when the annular valve member and the annular valve seat are coaxial.

The guide engaging surface region provides clearance between the annular valve member and the guide means, so as to reduce the risk of jamming when the valve member is tilted out of a plane perpendicular to the central axis (or receives forces which act to urge the valve member out of a plane perpendicular to the central axis). Thus the guide engaging surface region is shaped/configured such that the spacing between the guide means and the guide engaging surface region increases with distance from the minimum of spacing, which renders the annular valve member of the present invention more tolerant to tilting away from a plane perpendicular to the central axis (or to forces applied unevenly around the valve member which might otherwise cause the valve member to jam), than known annular valve members.

Preferably, a said seat-engaging surface and a said guide-engaging surface (of the guide engaging surface region) each extend smoothly to a convex (in radial cross section) surface extending around the annular valve member. Thus the surface of a radial cross section of the annular valve member extends from a guide-engaging surface and a seat-engaging surface to a convex surface. The convex surface may be a radiused surface. In some embodiments, some or all of the guide engaging surface region is convex in radial cross section, and may be radiused, and may be an extension of the radiused surface.

The guide means may be secured directly or indirectly to the annular valve seat, or the guide means and the annular valve seat may each be parts of a unitary construction (i.e. formed from a single piece of material) and the body may be of unitary construction.

In some embodiments, the guide means consists of a cylindrical guide.

Preferably, the annular valve member is loosely retained by the guide means. By loosely retained, we mean that the circumference of the guide means and the circumference extending around the corresponding surface or surfaces of the annular valve member differ by more than normal manufacturing tolerances. For example, the annular valve member may be retained around guide means (such as a cylindrical guide) and be provided with a guide engaging surface (or surfaces), the minimum inner circumference of which is slightly larger than the circumference around the guide means. Typically, the circumferences of the guide means and the respective part or parts of the annular valve member differ by at least 0.1%, in some embodiments at least 0.5%, and in some embodiments by at least 2%.

Thus, the minimum distance between the annular valve member and the guide means, when the annular valve member and guide means are coaxial, is in some embodiments at least 0.1%, in some embodiments at least 0.5%, and in some embodiments by at least 2%, of the diameter of the guide means.

The radial motion of a loosely retained annular valve is restricted by the guide means, such that the annular valve member and the annular valve seat are sufficiently well aligned to allow the formation of an effective seal by axial motion of the valve member, so as to close the valve, whilst maintaining sufficient clearance between the guide means and the annular valve member to further reduce the risk of jamming when the valve member is tilted away from perpendicular to the central axis. The additional clearance between the valve member and the guide means also reduces the risk of jamming caused by debris becoming trapped therebetween. A further advantage is that fluid is able to pass between the valve member and the guide means, thereby reducing drag and friction forces, and facilitating extremely rapid and efficient operation of the valve.

Conventional annular valve members are sized to closely engage (within manufacturing tolerances) with guide means. Such valve members are intolerant to tilting in relation to the guide means and the valve seat (i.e. in relation to an axis extending through the valve) and are typically provided with an extended "collar" and the valve with similarly extended guide means, in order to maintain alignment of the valve member. Such annular valve members must therefore have a comparatively high L/D ratio (typically in the range of 0.5-0.7), with concomitantly high mass, inertia and drag. By L/D we mean the ratio between the length of the valve member along its axis of symmetry and the diameter of the guide engaging formation (for example the internal diameter of an annular valve member of a valve having a cylindrical guide, around which the annular valve is slideably mounted).

A still further advantage of a loosely retained annular valve member which is tolerant to tilting away from the central axis, is therefore that the valve member may be constructed having a far smaller L/D ratio (of less than 0.5, and in some embodiments in the region of 0.1, or less than 0.1). Consequently, the annular valve member is also lighter than those of known annular valves, and may therefore be operated more rapidly, and is also much shorter, and therefore provides for a much more compact valve.

Preferably, the annular valve further comprises an end stop, to limit the maximum amount of axial motion of the annular valve member away from the annular valve seat.

In some embodiments, the end stop extends from the guide means. The end stop may be secured to the guide means (and for example may be a collar secured about or within the guide means), or the end stop may be integral to the guide means.

Preferably, the angle of tilt (away from perpendicular to the central axis) of the annular valve member is limited by the axial distance between the annular valve seat and the end stop. i.e. the axial distance between the axial valve seat and the end stop is preferably such that the annular valve member may tilt so as to abut the end stop and the guide means, or the end stop and the annular valve seat, but has insufficient room to contact the guide means at any two opposite sides of the guide means (that is to say points on each of the lines at which a plan extending through the central axis intersects the guide means) (which may otherwise cause the annular valve member to jam against the guide means).

That is to say, as a result of an annular valve member having an annular valve member which is loosely retained by guide means, the annular valve member is free to tilt in relation to the central axis (and also to move radially with respect to the central axis), out of alignment with the valve seat and the guide means;

and when a part of the annular valve member (typically a said seat-engaging surface) is in contact (sealedly or otherwise) with the annular valve seat (typically a said sealing surface), and a part of the annular valve member (typically the guide-engaging surface region) on the opposite side of the central axis is in contact with the end stop or the guide means, i.e. when the annular valve member has the maximum amount of tilt possible, the annular valve member cannot simultaneously contact the guide means on diametrically opposite sides of the guide means.

Preferably, the minimum distance L between the annular valve member and the guide means, when the annular valve member and the annular valve seat are coaxial and the annular valve member is oriented perpendicular to the central axis is given by:

$$L \geq \tfrac{1}{2} G (1/\cos \theta - 1)$$

where G is the diameter of the guide means and theta is the maximum angle of tilt of the annular valve member out of a plane perpendicular to the central axis, when a part of the annular valve member is in contact with the annular valve seat and a part of the annular valve member is in contact with the end stop.

Thus, the maximum angle of tilt theta is approximately theta=$\tan^{-1}$(M/G), where M is the maximum length of movement that the annular valve member is free to move along the central axis (i.e. between positions where the annular valve member abuts the end stop and the sealing surface), and G is the diameter of the guide means.

Preferably, of an annular valve member retained (or adapted to be retained) around guide means, no part of the annular valve member falls within a region defined by frusta extending from the minimum inner circumference at an angle equal to or less than theta away from the axis of symmetry of the annular valve member, wherein theta is the maximum angle that the annular valve member is free to tilt out of a plane perpendicular to the central axis (when the annular valve member is retained around the guide means).

Similarly, of an annular valve member retained (or adapted to be retained) within guide means, preferably no part of the annular valve member falls within a region defined by frusta extending from the maximum outer circumference at an angle equal to or less than theta away from the axis of symmetry of the annular valve member, wherein theta is the maximum angle that the annular valve member is free to tilt out of a plane perpendicular to the central axis (when the annular valve member is retained within the guide means).

Thus, a frustrum extending between the minimum inner (or maximum outer, as the case may be) circumference of the annular valve member and any other part of the guide engaging surface region (or other part of the annular valve member, such as any part of the or each said seat engaging surface) extends at an angle greater than theta away from the axis of symmetry of the annular valve member.

It may be that no part of the annular valve member falls within a region defined by frusta extending through a ring in the plane of the minimum of spacing when the annular valve member and annular valve seat are coaxial and having a diameter G+2L, the frusta having an axis coincident with the axis of symmetry of the annular valve member and a conical angle of 2theta.

Preferably, a part of the guide engaging surface region comprises the minimum inner (or maximum outer) circumference of the annular valve member.

In some embodiments, the valve seat comprises a first sealing surface having a first circumferential dimension and a second sealing surface having a second circumferential dimension, and wherein the or each said aperture is between the first and second sealing surface, the annular valve member comprising a first seat-engaging surface for cooperative engagement with the first sealing surface, and a second seat-engaging surface for cooperative engagement with the second sealing surface.

In some embodiments, the annular valve member is elastically deformable between a relaxed configuration in which the first seat-engaging surface is sized to sealedly engage with the first sealing surface and the second seat-engaging surface is disposed in relation to the first seat-engaging surface such that the second sealing surface and the second seat-engaging surface do not sealedly engage when the first sealing surface and the first seat-engaging surface are in sealing engagement; and a deformed configuration in which the second sealing surface and the second seat-engaging surface are in sealing engagement while the first sealing surface and the first seat-engaging surface are in sealing engagement, thereby restricting flow of fluid through the fluid pathway.

The annular valve member may be resiliently biased towards (or, in some embodiments, away from) the annular valve seat by resilient biasing means (such as a coiled spring).

Alternatively, or in addition, the annular valve member may be controllably urged away from (or towards) the annular valve seat by electronically controllable urging means, for example an electromagnet (typically secured to, or forming a part of, the body).

A portion of the body may, in some embodiments, define a cylinder adapted to receive a reciprocating piston (of a fluid working machine), and a portion of an external surface of the cylinder walls define the cylindrical guide for the annular valve member.

Thus, the invention extends in a third aspect to a cylinder assembly comprising an annular valve according to the first aspect, wherein the body defines a cylinder adapted to receive a reciprocating piston of a fluid working machine.

By a circumference we refer to the distance within or around respectively an interior or exterior surface. The first and second annular sealing surfaces, internal and external surfaces of the annular valve member, and the annular valve member itself, are typically rotationally symmetric but some departure from rotational symmetry is possible.

BRIEF DESCRIPTION OF DRAWINGS

An example embodiment of the present invention will now be illustrated with reference to the following Figures in which.

DESCRIPTION OF EMBODIMENTS

Figure 1:
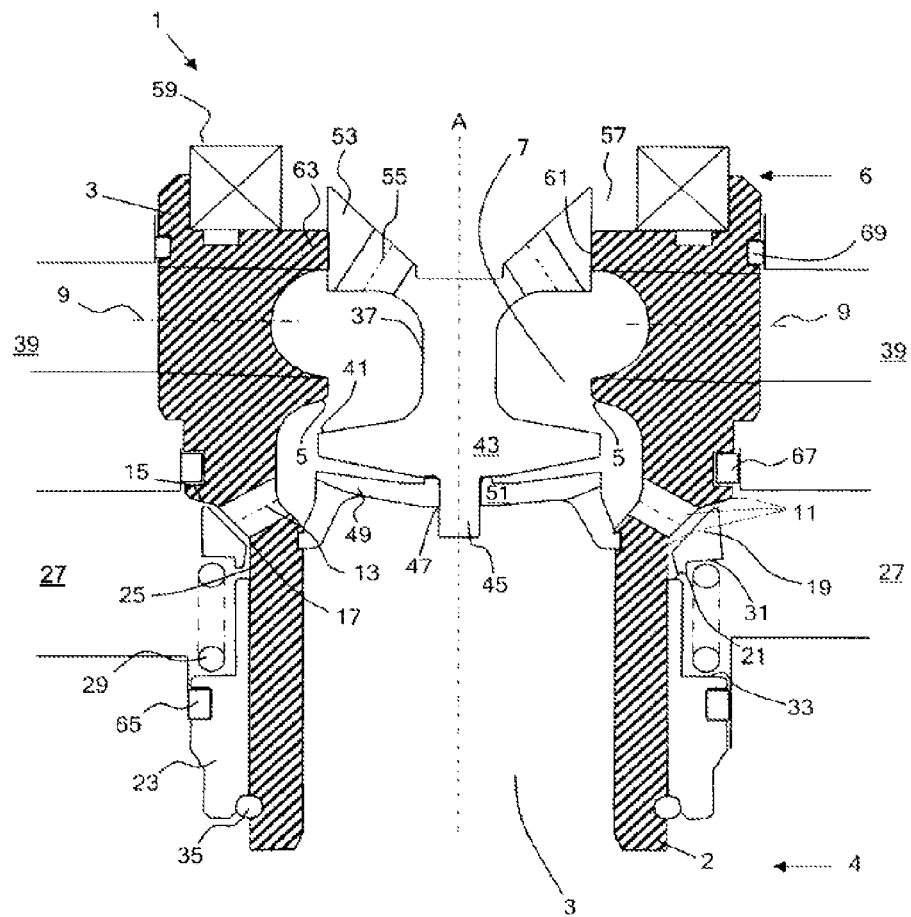
FIG. 1 is a cross sectional view of a cylinder assembly.

FIG. 1 shows a cylinder assembly 1 for use with a fluid-working machine, such as a hydraulic pump, a hydraulic motor or a hydraulic pump-motor. The cylinder assembly comprises a body 2 which is generally cylindrically symmetric around the cylinder axis A and comprises a cylinder 3 which is open to a first end 4 of the body, a poppet valve seat 5, located at a second end 6 of the body, and defining a poppet valve aperture 7 (providing a fluid pathway between the cylinder and radial passages 9 extending through an upper portion of the body), and an annular valve seat 11, defining a plurality of apertures 13 arrayed around and extending through the body. The annular valve seat comprises an outer sealing surface 15 and an inner sealing surface 17.

An annular valve member 19 is retained around the body between the annular valve seat and the end stop 21 of a collar 23. The annular valve member is threaded around the outer surface of the cylinder at a cylindrical guide surface region 25 of the cylinder. The guide surface region of the cylinder takes the form of a cylindrical guide and functions as guide means for the annular valve member.

The annular valve regulates the flow of hydraulic fluid between a high pressure manifold 27 and the cylinder, by way of the apertures 13. The annular valve member is biased towards the annular valve seat by coiled spring 29 which extends between the lower face 31 of the annular valve member and an opposed upper face 33 of the collar. The annular valve member has a seat engaging surface 34 for forming the inner and outer seals between the annular valve member and the annular valve seat. The collar is held in place by retaining ring 35. The collar may be provided with an interference fit around the cylinder for a part, or all, of the depth of the collar or the collar and cylinder body may be cooperatively engaged, for ease of installation and removal of the collar, annular high pressure valve and spring.

The assembly further comprises a poppet valve member 37 which, together with the poppet valve seat and poppet valve aperture, forms a poppet valve for controlling the flow of fluid between radial passages 9 (which are in fluid communication with a low pressure manifold 39) and the cylinder 5. The poppet valve member is operable to move along the axis A, such that the poppet valve may be moved between an open position (as shown) and a closed position where the sealing surface 41 (an annular region on an upper face of the head portion 43 of the poppet valve member) is in contact with the poppet valve seat.

The poppet valve member is provided at its lower end with a peg 45, which is in slideable engagement with a central aperture 47 in lower guide structure 49. The lower guide structure comprises and is held in place by radial struts 51 extending to the inner walls of the cylinder and, in use, functions to restrict movement of the peg away from the cylinder axis and to form a partial barrier to protect or isolate fluid flow between the cylinder and the low pressure manifold from the poppet, which would otherwise act to urge the poppet valve closed.

At its upper end, the poppet valve member is provided with an armature 53, comprising passages 55 extending between upper and lower faces of the armature, placing radial passages 39 in fluid communication with coil space 57 around which is located a solenoid coil 59, enabling the poppet valve to be electronically actuated by control signals from an electronic controller (not shown). The outer face of the armature is slidably engaged with the inner face 61 of upper guide structure 63. A first seal, 65, extends around a channel provided in the collar, and second and third seal 67, 69 extend around similar channels provided in the body, above the annular valve seat. The first and second seals prevent egress of pressurised hydraulic fluid from the high pressure manifold around the cylinder assembly during operation.

In contrast to the actively controlled poppet valve, in the present example the annular valve member is a passively opening and closing face sealing valve. The spring biases the annular valve member towards the annular valve seat. When the pressure within the cylinder is greater than the pressure in the high pressure manifold, the annular valve opens (as shown in FIG. 1) to enable hydraulic fluid to be exhausted from the cylinder to the high pressure manifold. When the pressure within the high pressure manifold is greater than the pressure in the cylinder, the annular valve member seals against the both the inner and outer sealing surfaces, forming a seal. In the example shown, the annular valve member is made from a resilient material and after contacting the outer sealing surface, the annular valve member deforms to enable the annular valve member to also form the inner seal. However, the invention is also applicable to annular valve members of which only a part is resilient, or which are rigid.

The annular valve member has an axis of circular symmetry which, in FIG. 1, is coincident with the cylinder axis A and the axis of the annular valve seat. The invention also extends to embodiments in which the cylinder axis and the axis of the annular valve seat are different. However, the annular valve member is loosely retained on the guide means, such that there can be a small amount of tilting of annular valve member relative to the cylinder and annular valve seat, and there can also be a small amount of radial movement of the annular valve member.

Figure 2:
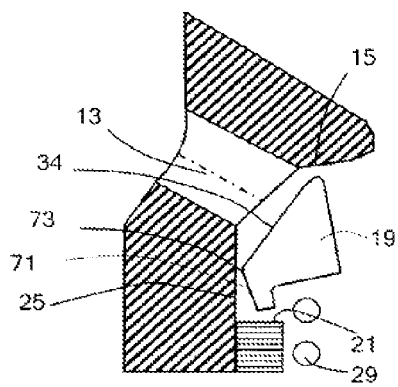
FIG. 2 is a cross-section through one side of an annular valve, when the annular valve member is in a position in which its axis is coincident with the axis of the annular valve seat and the cylinder axis.

FIG. 2 illustrates the annular valve member in a position in which its axis is coincident with the axis of the annular valve seat and the cylinder axis. The annular valve member has a guide-engaging surface region 71. The spacing between the guide-engaging surface region and the guide surface region of the cylinder (i.e. the radial distance between the guide surface region of the cylinder and the overlying radially inward surface of the guide-engaging surface region) varies in an axial direction and there is a minimum 73 of spacing when the axes of the annular valve member and the annular valve seat are coincident. To either side of the minimum of spacing, the spacing between the annular valve member and the guide surface region of the cylinder increases.

Figure 3:
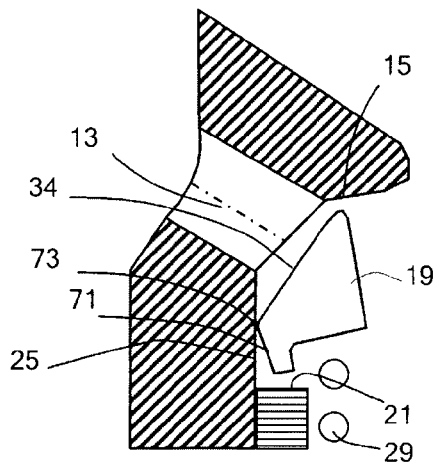
FIG. 3 is a cross-section through one side of the annular valve of FIG. 2, with the annular valve member displaced radially inwards.
Figure 4:
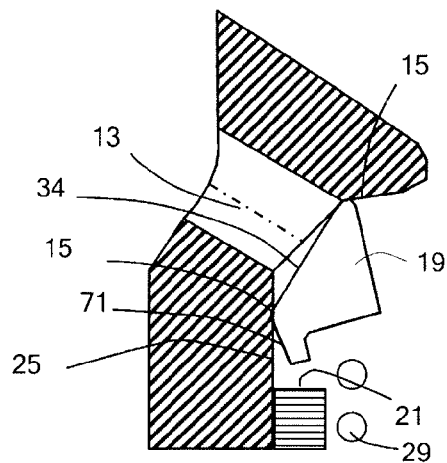
FIG. 4 is a cross-section through one side of the annular valve of FIG. 2, with the annular valve member tilted in one sense.

FIG. 3 shows the annular valve displaced radially inwards at the point through which the cross-section has been taken (the opposite side of the annular valve will be displaced radially by the same amount). FIG. 4 shows the annular valve tilted in one sense until it contacts the annular valve seat and FIG. 5 shows the annular valve tilted in the opposite sense until it contacts the end stop.

Figure 5:
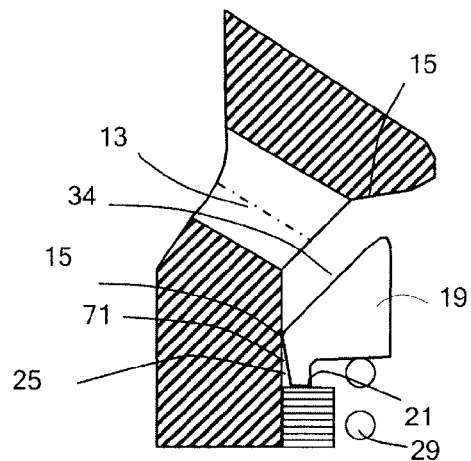
FIG. 5 is a cross-section through one side of the annular valve of FIG. 2, with the annular valve member tilted in the other sense.
Figure 6:
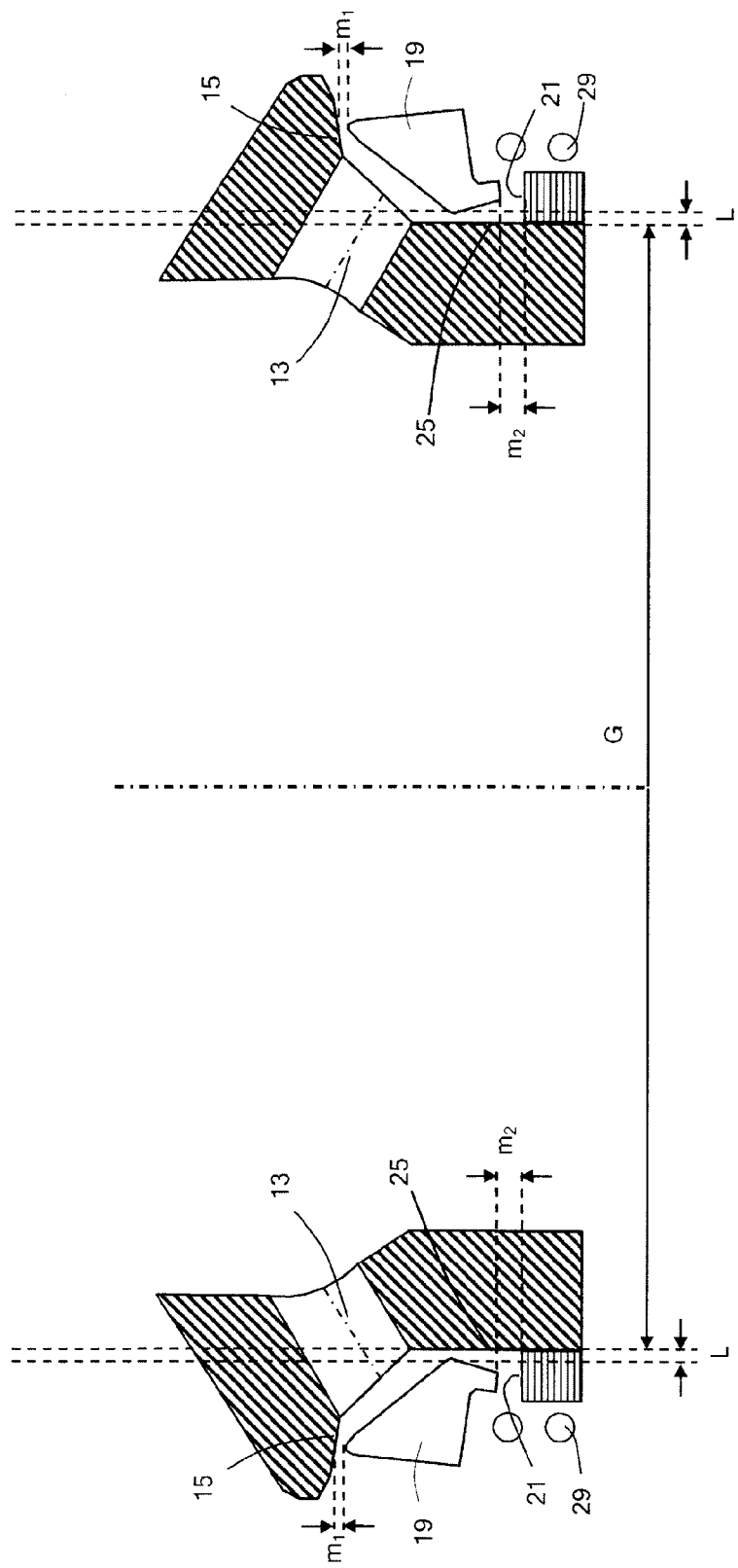
FIG. 6 is a cross-section through the annular valve of FIG. 2.
Figure 7:
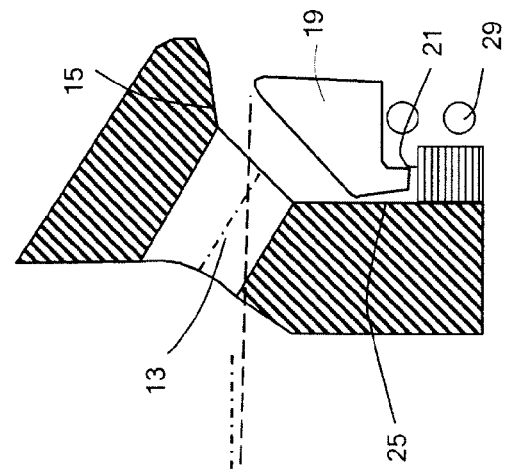
FIG. 7 is a cross-section through the annular valve of FIG. 2, with the annular valve member tilted in the sense of FIG. 5.
Figure 7:
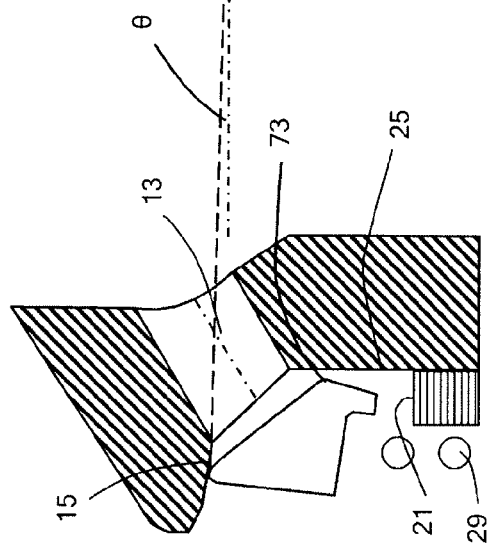

FIG. 6 shows opposite side of the annular valve in the configuration of FIG. 2 and FIG. 7 shows opposites sides of the annular valve in the configuration of FIG. 5. With reference to these figures, G is the diameter of the guide surface region of the cylinder and L is the spacing between the guide surface region and the guide-engaging surface region at the minimum of spacing (in each case, when the annular valve member and annular valve seat are coaxial).

At maximum tilt, the annular valve member may contact the end stop on one side and either guide surface region or the annular valve seat on the other, or may contact the annular valve seat on one side and the guide surface region on the other side. However, it can be seen that the axial extent of the annular valve member and the spacing between the end stop and the annular valve seat are configured such that the annular valve member cannot tilt sufficiently to contact the guide surface region simultaneously at two diametrically opposite sides of the annular valve member. This avoids the possibility of the annular valve member jamming by contacting the guide surface region simultaneously on diametrically opposite sides. In FIG. 7, theta represents the maximum angle which it is possible for the annular valve member to tilt relative to the axis of the annular valve seat.

As the maximum angle of tilt, theta, is such that the annular valve member cannot contact the guide surface region simultaneously at two diametrically opposite sides of the annular valve member, L, the minimum distance between the annular valve member and the guide surface region (when the annular valve member and annular valve seat are coaxial) fulfils the following relationship:

$L \geq \frac{1}{2} G (1/\cos \text{theta} - 1)$

Thus, the maximum angle of tilt theta is approximately theta=$\tan^{-1}$(M/G), where M is the maximum distance which the annular valve member is free to move along the central axis, M, which is the sum of $m_1$ and $m_2$ shown in FIG. 6.

Figure 8A:
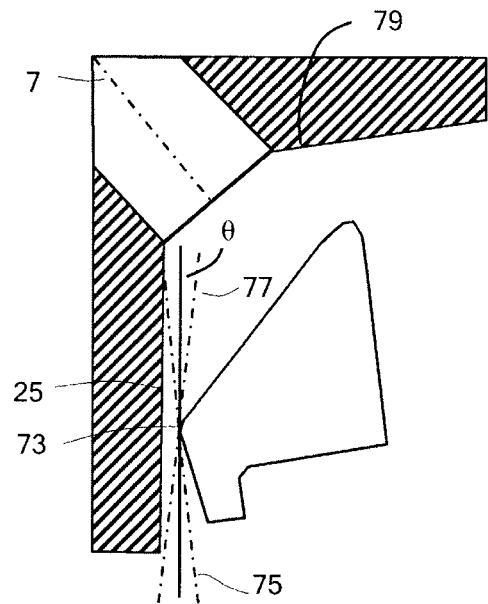
FIG. 8A is a cross-section through one side of the annular valve of FIG. 2.

With reference to FIG. 8A, in order to ensure that there cannot be jamming, while still providing a compact annular valve, it is preferred that no part of the annular valve member extends into the volume defined by virtual frusta 75, 77 which are coaxial with the annular valve member, extending from the minimum of spacing at an angle of theta to the axis of the annular valve member. In this embodiment, no part of the annular valve member falls within a region defined by frusta extending through a ring having a diameter G+2L, an axis coincident with the axis of symmetry of the annular valve member and a conical angle of 2theta.

The annular valve of the invention is advantageous in that it has a sufficiently small internal diameter to restrict the radial motion of the annular valve member enough to enable an effective seal to be reliably formed, but without jamming when the valve member is tilted. There is sufficient space to reduce the risk of jamming resulting from trapped debris.

The design is also such that drag and friction acting on the annular valve member are low, allowing rapid and energy efficient operation of the annular valve. This arises as there is only one guiding line, rather than two guiding lines spaced a significant distance apart in known annular valves mounted on a guide, which has at least some sliding length. Known annular valves typically involve a tightly fitting collar around a guide, with a thin oil film between, which generates shear drag.

Furthermore, the design is sufficiently strong to withstand the stresses from high pressure oil acting on it.

Figure 8B:
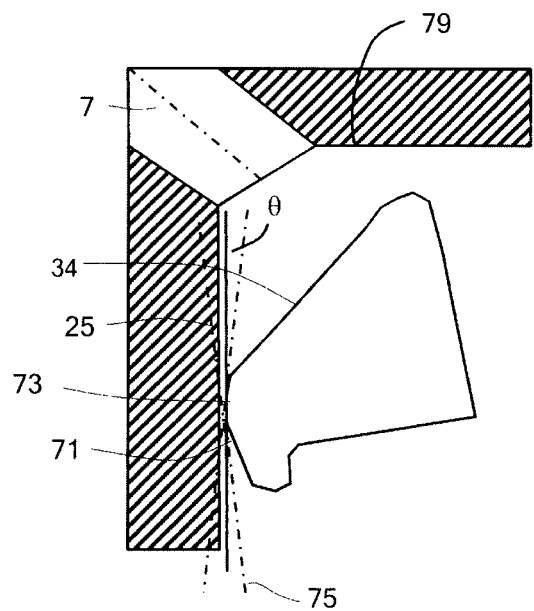
FIG. 8B is a cross-section through one side of an alternative embodiment of an annular valve.

FIG. 8B is a cross-section through an annular valve of an alternative embodiment, in which the outer sealing surface extends orthogonally to the axis of the annular valve seat. The angle of the outer sealing surface can vary between embodiments, for example it may extend at an angle of 30° to 90° from the axis of the annular valve seat (coincident with cylinder axis A in this embodiment). For example, the outer sealing surface may extend at an angle of 30° to 90° from the axis of the annular valve seat. In this embodiment, a length of the guide-engaging surface region has the same diameter and so the minimum of spacing has an axial extent. The frusta extend from either end of the minimum of spacing.

Figure 8C:
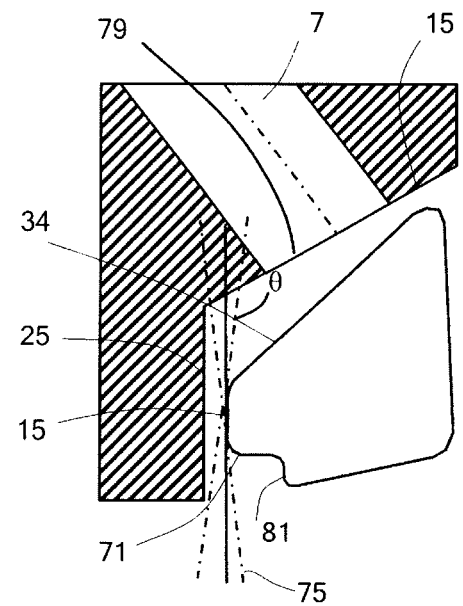
FIG. 8C is a cross-section through one side of an alternative embodiment of an annular valve.

FIG. 8C is a cross-section through an annular valve of an alternative embodiment in which the apertures 7 do not intersect the outer surface of the cylinder but instead open only onto an outward extending peripheral surface 79 of the cylinder body including the outer sealing surface, which extends at an obtuse angle to the outer surface of the cylinder. In this embodiment, the spacing of the guide-engaging surface changes discontinuously from the minimum of spacing to a higher diameter surface region 81.

Figure 8D:
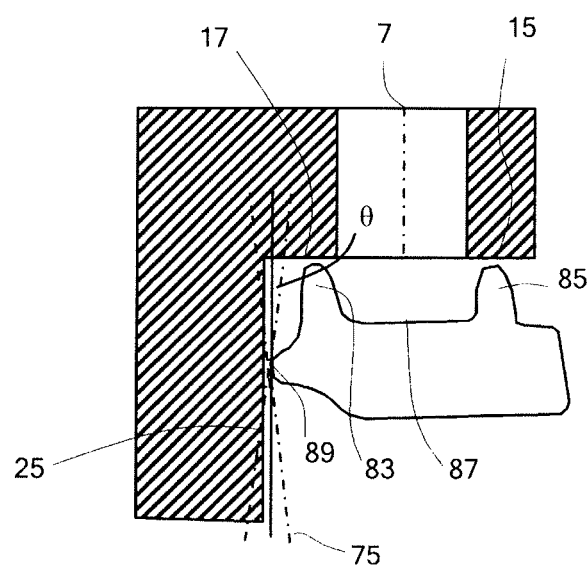
FIG. 8D is a cross-section through one side of an alternative embodiment of an annular valve.

FIG. 8D is a cross-section through an annular valve of an alternative embodiment in which the apertures 7 open onto an outwardly extending peripheral surface of the cylinder body, including both the inner 17 and the outer 15 sealing surface, which extends orthogonally to the axis of annular valve seat. In this embodiment, the inner and outer sealing surfaces are in the same plane, orthogonal to the axis of the annular valve seat. In this embodiment, the annular valve member has inner and outer circumferential ridges 83, 85 which extends axially from the seat facing surface 87 of the annular valve member to form the inner and outer seals in use. In this case, instead of the inner seal being formed by part of the guide-engaging surface of the annular valve member, the guide-engaging surface of the annular valve member includes a guiding formation 89, which also functions as the minimum of spacing. In this embodiment, the spacing of the guide-engaging surface increase monotonically, but with a varying gradient, away from the minimum of spacing.

In the illustrated examples, the outer surface of the cylinder functions as guide means for the annular valve member. However, alternatively, it would be possible for one or more guide members, arranged in a cylinder, and extending through the annular valve member to function as guide means. In some alternative embodiments, the guide means could be located outside the annular valve member.

Figure 9:
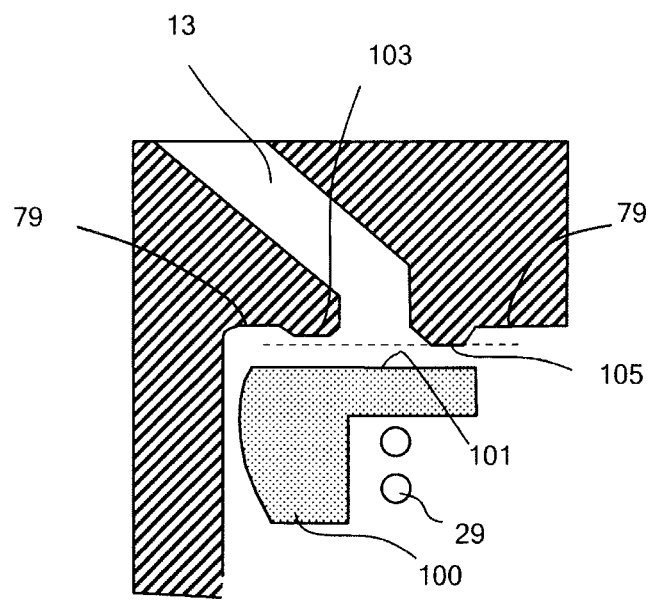
FIG. 9 is a cross-section through one side of an alternative embodiment of an annular valve.

FIG. 9 is a cross-section through an annular valve of an alternative embodiment in which the annular valve member 100 has a planar seat contacting surface 101. The inner and outer seals are formed by inner and outer circumferential ridges 103, 105 on an outwardly extending peripheral surface 79.

Further variations and modifications may be made within the scope of the invention herein disclosed.

REFERENCE SIGNS LIST

1 Cylinder assembly
2 Body
3 Cylinder
4 First end of cylinder
5 Poppet valve seat
6 Second end of cylinder
7 Poppet valve aperture
9 Radial passages
11 Annular valve seat
13 Apertures
15 Outer sealing surface
17 Inner sealing surface
19 Annular valve member
21 End stop
23 Collar
25 Guide surface region (guide means)
27 High pressure manifold
29 Spring
31 Lower face of annular valve member
33 Upper face of collar
34 Seat engaging surface
35 Retaining ring
37 Poppet valve member
39 Low pressure manifold
41 Sealing surface
43 Head portion
45 Peg
47 Central aperture
49 Lower guide structure
51 Radial struts
53 Armature
55 Passages
57 Coil space
59 Solenoid
61 Inner face
63 Upper guide structure
65 First seal
67 Second seal
69 Third seal
71 Guide-engaging surface region
73 Minimum of spacing
75 Virtual frustrum
77 Virtual frustrum
79 Peripheral surface
81 Higher diameter surface region
83 Inner circumferential ridge
85 Outer circumferential ridge
87 Seat facing surface
89 Guiding formation
100 Annular valve member
101 Seat contacting surface
103 Inner circumferential ridge
105 Outer circumferential ridge

The invention claimed is:

1. A face sealing annular valve for a fluid working machine, the valve having a valve body arranged around a central axis and comprising an annular valve seat and guide means, and an annular valve member located around or within the guide means;

the guide means comprising one or more cylindrically arranged guides to restrict radial motion of the annular valve member, the guide means being configured to loosely retain the annular valve member around or within the guide means so that the annular valve member is free to tilt out of a plane perpendicular to the central axis within a maximum tilt angle;

the annular valve member arranged around an axis of symmetry and moveable axially in relation to the guide means to sealedly engage with the annular valve seat; and a guide engaging surface region extending around a circumference of the annular valve member;

characterised in that the annular valve member has a minimum inner circumference or maximum outer circumference at which the guide engaging surface region of the annular valve member faces the guide means across a minimum spacing between the annular valve member and the guide means, when the annular valve member and the annular valve seat are coaxial, the annular valve member is configured so that, when the annular valve member and the annular valve seat are coaxial, the spacing between the guide means and the guide-engaging surface region increases with distance along the central axis from the minimum spacing at the minimum inner circumference or maximum outer circumference, and the annular valve member is configured such that no part of the annular valve member falls within a region defined by frusta extending from the minimum inner circumference or maximum outer circumference at an angle equal to the maximum tilt angle away from the axis of symmetry.

2. The annular valve according to claim 1, wherein the spacing between the guide means and the annular valve member increases continuously with distance along the central axis from the minimum of spacing.

3. A face sealing annular valve for a fluid working machine, the valve having a valve body arranged around a central axis and comprising an annular valve seat and guide means, and an annular valve member located around or within the guide means;

the guide means comprising one or more cylindrically arranged guides to restrict radial motion of the annular valve member;

the annular valve member arranged around an axis of symmetry and moveable axially in relation to the guide means to sealedly engage with the annular valve seat; and a guide engaging surface region extending around a circumference of the annular valve member;

characterised in that the annular valve member is configured so that, when the annular valve member and the annular valve seat are coaxial, the spacing between the guide means and the guide-engaging surface region increases with distance along the central axis from a minimum of spacing between the annular valve member and the guide means, wherein the guide means consists of a cylindrical guide, and the cylindrical guide extends over an entire circumference of the annular valve member on an inner or outer circumferential side of the annular valve member.

4. An annular valve according to claim 3, wherein the annular valve member is loosely retained by the guide means.

5. The annular valve according to claim 1, wherein the annular valve further comprises an end stop, to limit the maximum amount of axial motion of the annular valve member away from the annular valve seat.

6. The annular valve according to claim 5, wherein the maximum angle of tilt of the annular valve member in relation to the central axis is limited by the axial distance between the annular valve seat and the end stop.

7. The annular valve according to claim 6, wherein the annular valve member is configured to be loosely retained by the guide means so that, when the annular valve member tilts relative to the guide means by the maximum tilt angle, the annular valve member cannot simultaneously contact the guide means on diametrically opposite sides of the guide means which are on a line extending through the central axis.

8. The annular valve according to claim 6, wherein the minimum distance L between the annular valve member and the guide means, when the annular valve member and the annular valve seat are coaxial and the annular valve member is oriented perpendicular to the central axis is given by:

$$L \geq \tfrac{1}{2}G(1/\cos\theta - 1)$$

where G is the diameter of the guide means and theta is the maximum tilt angle when a part of the annular valve member is in contact with the annular valve seat and a part of the annular valve member is in contact with the end stop.

9. The annular valve according to claim 8, wherein no part of the annular valve member falls within a region defined by frusta extending through a ring in the plane of the minimum of spacing when the annular valve member and annular valve seat are coaxial and having a diameter G+2L, the frusta having an axis coincident with the axis of symmetry of the annular valve member and a conical angle of 2theta.

10. A face sealing annular valve for a fluid working machine, the valve having a valve body arranged around a central axis and comprising an annular valve seat and guide means, and an annular valve member located around or within the guide means;
   the guide means comprising one or more cylindrically arranged guides to restrict radial motion of the annular valve member;
   the annular valve member arranged around an axis of symmetry and moveable axially in relation to the guide means to sealedly engage with the annular valve seat; and
   a guide engaging surface region extending around a circumference of the annular valve member;
   characterised in that the annular valve member is configured so that, when the annular valve member and the annular valve seat are coaxial, the spacing between the guide means and the guide-engaging surface region increases with distance along the central axis from a minimum of spacing between the annular valve member and the guide means,
   wherein the guide means includes cylindrical guide means which defines a cylinder adapted to receive a reciprocating piston, and which has an external cylindrical surface defining said one or more cylindrically arranged guides for the annular valve member.

11. The annular valve according to claim 1, wherein the annular valve member is retained around the guide means and wherein the diameter of the guide-engaging surface region increases with distance along the axis of symmetry from a minimum inner diameter of the annular valve member.

12. An annular valve member for the face sealing annular valve according to claim 1, wherein the annular valve member arranged around an axis of symmetry and comprising the guide engaging surface region extending around a circumference of the annular valve member for engagement around cylindrically arranged guide means of the face sealing annular valve for the fluid working machine;
   characterised in that the diameter of the guide-engaging surface region increases with distance along the axis of symmetry from a minimum inner diameter of the annular valve member.

13. The annular valve according to claim 10, wherein the annular valve member is loosely retained by the guide means.

14. The annular valve according to claim 10, wherein the annular valve member is retained around the guide means and wherein the diameter of the guide-engaging surface region increases with distance along the axis of symmetry from a minimum inner diameter of the annular valve member.

15. The face sealing annular valve according to claim 10, wherein
   the annular valve member is arranged around an axis of symmetry,
   the guide engaging surface region extends around a circumference of the annular valve member for engagement around cylindrically arranged guide means of the face sealing annular valve for the fluid working machine, and
   the diameter of the guide-engaging surface region increases with distance along the axis of symmetry from a minimum inner diameter of the annular valve member.

* * * * *